Patented Sept. 8, 1936

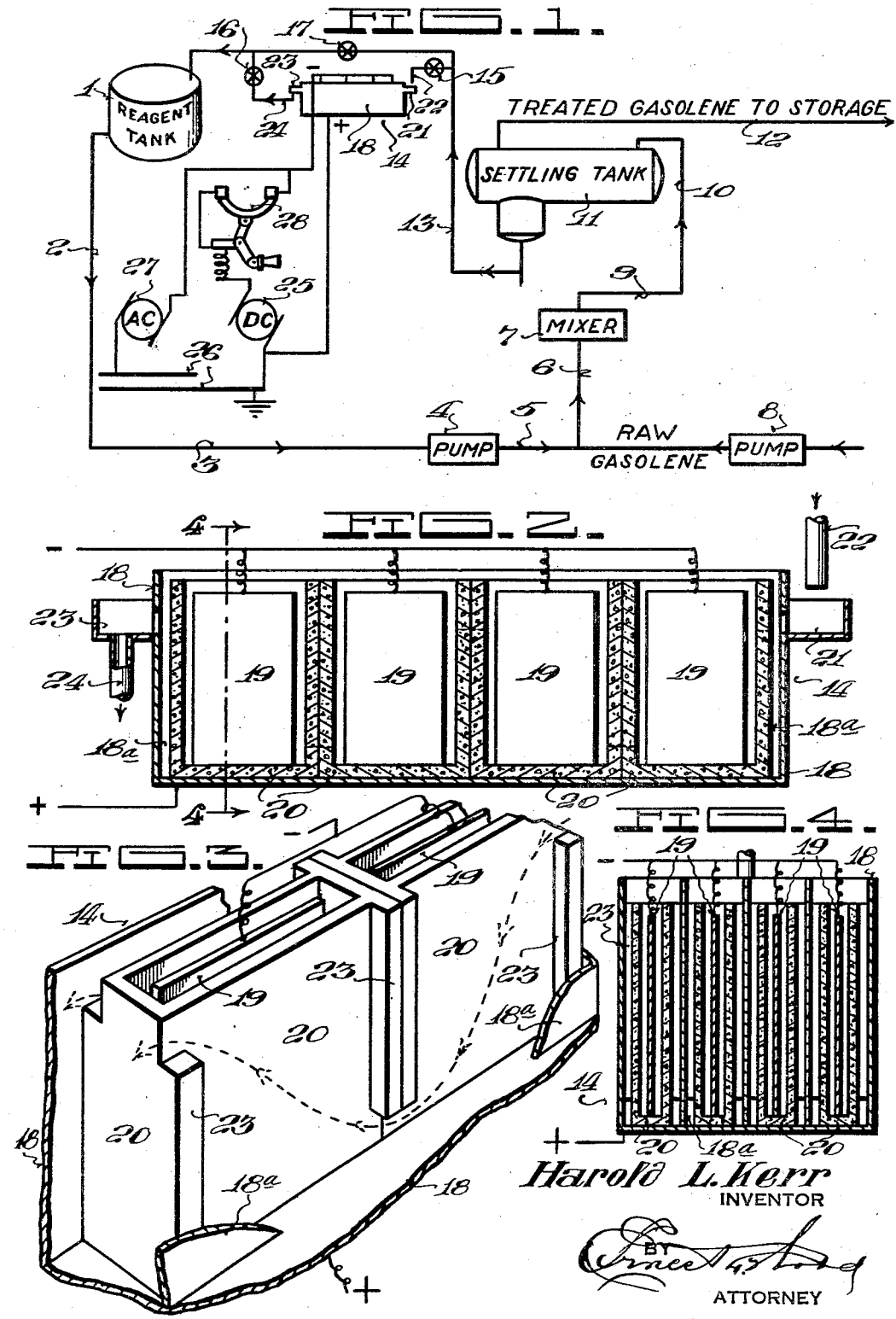

2,053,909

UNITED STATES PATENT OFFICE 2,053,909

METHOD FOR REMOVING SULPHUR COMPOUNDS FROM PETROLEUM DISTILLATES

Harold L. Kerr, Dallas, Tex., assignor to Frank Gardner, Dallas, Tex.

Application June 22, 1934, Serial No. 731,907

4 Claims. (Cl. 196—33)

This invention relates to a method for treating hydrocarbons, and it has particular reference to a method for treating gasoline to effect the removal of objectionable sulphur compounds.

The principal object of the invention is the provision of a method whereby the removal of the objectionable compounds is effected by the use of a compound which is highly reactive as an oxidizing agent for the purpose specified.

Another object is the provision of a treating compound which remains unchanged in solution, and does not become hydrolized to form an insoluble compound.

Another object is the provision of a method whereby the reduced compound may be readily reoxidized electrolytically, thereby preparing the same for re-use.

Still another object is the provision of means embodied in the apparatus for the electrolytic regeneration of the compound, whereby the compound is returned to its original state in a pure form, and wherein the electrodes are of such character that action of the electrolyte thereon will maintain them in a clean condition, thus preventing the undesirable effects encountered when electrodes are so acted upon as to become coated.

Still another object is the provision of a treating compound which may be regenerated electrolytically with a high degree of current efficiency, due to the formation of considerably less molecular oxygen than is formed in regenerative process heretofore employed.

With the foregoing objects as paramount, the invention has particular reference to the novel steps of the method hereinafter defined, taken in connection with the accompanying drawing, in which:

Figure 1 is a diagrammatic representation of the invention, showing the application thereof to the treating of hydrocarbons, and further showing the electrical connections for the regeneration of the spent compound.

Figure 2 is a longitudinal section of the regeneration cell.

Figure 3 is a fragmentary view in perspective, and

Figure 4 is a view on the line 4—4 on Figure 2.

In the manufacture of gasolene, kerosene, etc., it is necessary to treat these distillates to remove the objectionable odor resulting from hydrogen sulphide and mercaptans. Hydrogen sulphide is usually removed by washing with water or a solution of sodium hydroxide, while the mercaptans are changed to the unobjectionable disulphides by the use of sodium plumbite, commonly called "doctor solution", and sulphur according to the following equations:

Let R represent a hydrocarbon group such as ethyl $C_2H_5$.

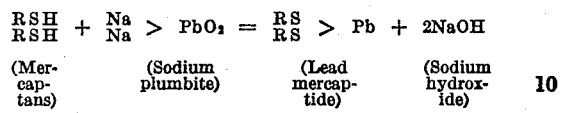

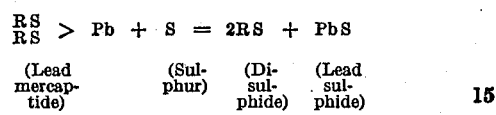

Another method which has met with reasonable success in the removal of mercaptans from petroleum distillates, is based on the reactions of sodium meta-plumbate, which may be represented:

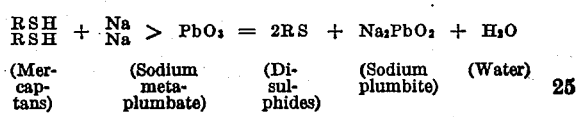

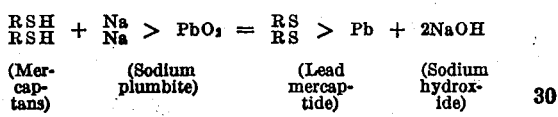

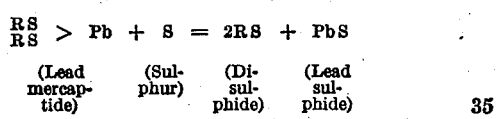

It will be noted that the first two molecules of mercaptans are converted to di-sulphides by oxidation, the sodium meta-plumbate being reduced to plumbite, while the next two are converted to di-sulphides by the action of the plumbite and sulphur.

With the use of sodium meta-plumbate, electrolytic regeneration is possible and is preferably effected after the sodium meta-plumbate has been reduced to plumbite.

The present invention relates to the use of sodium ortho-plumbate as a treating compound for changing mercaptans into disulphides. This compound possesses many advantages over the sodium meta-plumbate, and comparative tests in treating gasolene have shown the reaction time with sodium ortho-plumbate to be but a small fraction of the time required when sodium meta-plumbate is used.

The reactions between sodium ortho-plumbate and mercaptans may be represented:

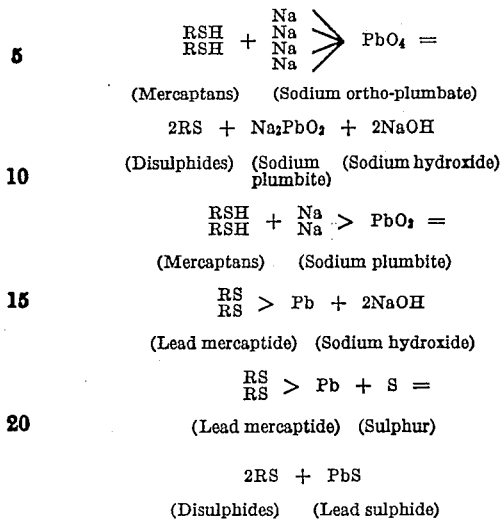

It will be seen that the first two molecules of mercaptans are converted to di-sulphides by oxidation, as in the case when sodium meta-plumbate is used. However, the time required for this oxidation is appreciably less when the reagent is the ortho-plumbate. Obviously, during the treating operation both ortho-plumbate and plumbite are present in the treating solution since plumbite is formed by the action of the mercaptans on the ortho-plumbate. As previously stated, it is possible to regenerate sodium ortho-plumbate after it has been reduced or spent. This is best accomplished electrolytically, and is preferably effected after the sodium ortho-plumbate has been reduced to sodium plumbite.

Figure 1 represents diagrammatically the application of the invention to the treating of gasolene or other hydrocarbons. Sodium ortho-plumbate from the tank 1 is pumped through pipes 2 and 3 by means of a pump 4, from which it is forced through pipes 5 and 6 to a mixer 7. In this mixer the reagent is mixed with raw gasolene which is forced into the mixer 7 by the pump 8. The mixed liquids pass through the pipes 9 and 10 to the settling tank 11. The treated gasolene is piped to storage through the pipe 12, and the spent ortho-plumbate, now in the form of plumbite, enters the pipe 13 and passes through the regeneration cell 14 to the tank 1, the valves 15 and 16 being open and the valve 17 closed. In the cell 14 the sodium plumbite is regenerated to sodium ortho-plumbate, the reaction being:

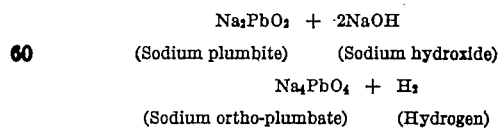

After the sodium ortho-plumbate has been regenerated it is returned to the storage tank 1 where it is ready for re-use.

The regeneration cell 14 includes a container which comprises an anode 18, which is formed of metal which is slightly soluble in the electrolyte, such as copper or a copper alloy, and a plurality of cathode plates 19, which may be of iron or other suitable material.

The cathode plates 19 are encased within porous tile jars 20, which are shaped as best shown in Fig. 3. The cathode plates 19 are electrically connected as shown. The spent solution to be regenerated, or a fresh solution of sodium plumbite which is to be oxidized to sodium ortho-plumbate, enters the trough 21 of the cell 14 through the pipe 22.

The cell 14 is divided longitudinally by the anode plates 18a, which combine with the container 18 to form the cell anode. The trough 21 communicates with each of the compartments formed within the container 18 by the plates 18a, and within which repose the porous jars 20. These jars are provided with integrally formed baffles 23, which serve to direct the solution being regenerated in a sinuous path as shown in Figure 3, which exposes the solution to a relatively long oxidation period within the cell 14. After passing through the cell the regenerated solution enters the trough 23 and passes to the tank 1 by way of pipe 24.

The electrical circuits necessary to effect the oxidation of sodium plumbite to sodium ortho-plumbate are shown in Figure 1. A direct current of approximately 8 amperes per square foot is supplied by a direct current generator 25, and an alternating current of approximately 8 amperes per square foot is superimposed to avoid polarization. Alternating current from the 110 volt lines 26 is used to drive the motor 27 of a motor generator set, and is also superimposed on the direct current in the cell from the generator 25. An overlord circuit breaker 28 is installed in the direct current circuit to avoid damage to the generator 25 in case of a sudden rise in the current in this circuit.

It has been found that sodium ortho-plumbate rather than sodium meta-plumbate is formed when sodium plumbite is treated electrolytically as above described, using an anode such as copper or other metal slightly soluble in an alkaline electrolyte. Under these conditions a relatively small quantity of molecular oxygen is formed. This type of electrode presents a clean metallic surface at all times to the electrolyte and has the effect, under the above described conditions to yield the more reactive ortho-plumbate.

This compound differs from the meta-plumbate in the relative proportions of its component elements, as well as in its properties and reactions. The ortho-plumbate may be crystallized from solution by careful evaporation at room temperature under a high vacuum. The crystals so obtained are colorless plates, which are comparatively unstable.

These plates upon analysis show the formula to be $Na_4PbO_4 3H_2O$. No hydrolysis takes place when a solution of the ortho-plumbate is allowed to stand in a tight container, whereas the meta-plumbate hydrolyzes to meta-plumbic acid, a peculiar hair-like crystalline precipitate resembling asbestos in appearance and having the formula $H_2PbO_3 3H_2O$.

Manifestly the method described is capable of considerable modification and such modification as may fall within the scope of the appended claims is considered within the spirit and intent of the invention.

What is claimed is:

1. A method for removing sulphur compounds from petroleum distillates which comprises subjecting said distillates to the action of sodium ortho-plumbate.

2. A method for oxidizing mercaptans to disulphides which comprises subjecting said mercaptans to the action of sodium ortho-plumbate.

3. A method for removing sulphur compounds from petroleum distillates which comprises subjecting said distillates to the action of a solution of sodium ortho-plumbate and sodium plumbite.

4. A method for oxidizing mercaptans to disulphides which comprises subjecting said mercaptans to the action of a solution of sodium ortho-plumbate and sodium plumbite.

HAROLD L. KERR.